United States Patent
Schiferl et al.

(10) Patent No.: US 10,499,567 B2
(45) Date of Patent: Dec. 10, 2019

(54) RAKING APPARATUS WITH INDEPENDENTLY ADJUSTABLE RAKING WIDTH AND WINDROW WIDTH

(71) Applicant: Vermeer Manufacturing Company, Pella, IA (US)

(72) Inventors: Tyler G. Schiferl, Pella, IA (US); Michael S. Kindley, Oskaloosa, IA (US); Michael R. Vaske, Knoxville, IA (US); Kent L. Thompson, Otley, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 15/538,023

(22) PCT Filed: Feb. 1, 2017

(86) PCT No.: PCT/US2017/016047
§ 371 (c)(1),
(2) Date: Jun. 20, 2017

(87) PCT Pub. No.: WO2017/136439
PCT Pub. Date: Aug. 10, 2017

(65) Prior Publication Data
US 2018/0317390 A1 Nov. 8, 2018

Related U.S. Application Data

(60) Provisional application No. 62/290,112, filed on Feb. 2, 2016.

(51) Int. Cl.
*A01D 43/02* (2006.01)
*A01D 57/28* (2006.01)
*A01D 57/12* (2006.01)
*A01D 78/14* (2006.01)

(52) U.S. Cl.
CPC .............. *A01D 57/28* (2013.01); *A01D 57/12* (2013.01); *A01D 78/14* (2013.01)

(58) Field of Classification Search
USPC .................... 56/341, 375–377, 365, 384, 385
See application file for complete search history.

(56) References Cited

U.S. PATENT DOCUMENTS

| | | | | |
|---|---|---|---|---|
| 3,466,860 A | * | 9/1969 | Van Der Lely | ...... A01D 78/148 56/377 |
| 4,047,370 A | | 9/1977 | Eve | |
| 4,077,189 A | * | 3/1978 | Hering | .................... A01D 43/02 56/11.9 |
| 4,343,142 A | | 8/1982 | Allen | |
| 4,753,063 A | * | 6/1988 | Buck | ..................... A01D 78/144 56/370 |
| 4,932,197 A | * | 6/1990 | Allen | .................... A01D 78/001 56/228 |

(Continued)

*Primary Examiner* — Thomas B Will
*Assistant Examiner* — Mai T Nguyen
(74) *Attorney, Agent, or Firm* — Armstrong Teasdale LLP (57) ABSTRACT

An adjustable raking apparatus for gathering crop material into a windrow is disclosed. The raking apparatus allows the raking width and the windrow width to be independently adjusted. In some embodiments, both the raking width and the windrow width may be adjusted by the operator from the pulling vehicle attached to the raking apparatus.

20 Claims, 11 Drawing Sheets

(56) References Cited

U.S. PATENT DOCUMENTS

| | | | | |
|---|---|---|---|---|
| 4,947,631 A | * | 8/1990 | Kuehn | A01D 78/001 56/15.5 |
| 5,065,570 A | * | 11/1991 | Kuehn | A01D 78/001 56/377 |
| 6,000,207 A | * | 12/1999 | Menichetti | A01D 78/144 56/365 |
| 6,314,710 B1 | | 11/2001 | Tonutti | |
| 8,001,755 B2 | * | 8/2011 | Menichetti | A01D 78/144 56/228 |
| 8,146,338 B1 | | 4/2012 | Cicci et al. | |
| 8,186,140 B1 | | 5/2012 | Cicci et al. | |
| 8,474,232 B2 | | 7/2013 | Peden | |
| 9,167,746 B2 | | 10/2015 | Bassett et al. | |
| 2002/0069634 A1 | | 6/2002 | Tonutti | |
| 2010/0146924 A1 | | 6/2010 | Peden | |
| 2012/0023888 A1 | | 2/2012 | Schmidt et al. | |
| 2013/0263567 A1 | | 10/2013 | Bassett et al. | |

* cited by examiner

RAKING APPARATUS WITH INDEPENDENTLY ADJUSTABLE RAKING WIDTH AND WINDROW WIDTH

CROSS-REFERENCE TO RELATED APPLICATION

This application is a 35 U.S.C. § 371 National Stage application of International Application No. PCT/US2017/016047, filed Feb. 1, 2017, which claims the benefit of U.S. Provisional Patent Application No. 62/290,112, filed Feb. 2, 2016, both of which are incorporated herein by reference in their entirety.

FIELD OF THE DISCLOSURE

The field of the disclosure relates to raking apparatus and, in particular, adjustable raking apparatus for gathering crop material into a windrow. In some embodiments, the raking apparatus allows the raking width and the windrow width to be independently adjusted.

BACKGROUND

Wheel rakes are used to rake crop materials to gather the material into windrows for baling and to promote drying of the material. Wheel rakes are typically configured as a V-rake in which two sets of rake wheels on each side of the rake turn and gather material to the middle of the rake to discharge the material into a windrow. "Carted" V-rakes may include a main frame having two "tool bars" which extend from the main frame to which a set of rake wheels are attached. The rake arms may be positioned above the main frame in a closed or traveling position or extended in the form of a "V" in the open or raking position.

Commercial wheel rakes allow the raking width to be changed manually by the operator. The width of the windrow may also be changed manually in some commercial rakes; however, a change in the windrow width typically causes the raking width to change and vice versa. Such rakes do not provide independent raking width and windrow width settings.

A need exists for wheel rakes that allow the raking width and the windrow width to be independently controlled and thereby increase the use range of the rake. A need also exists for methods that allow for the raking width and/or windrow width to be controlled by the operator from the pull vehicle (e.g., tractor).

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an adjustable raking apparatus for gathering crop material into a windrow. The raking apparatus comprises a plurality of rake wheels and a main frame having a first arm and a second arm. The first arm and the second arm are each adjustable between an extended operating position in which the rake wheels engage a surface supporting the raking apparatus and a travel position in which the rake wheels are raised from the surface. A first forward tool bar is pivotally attached to the first arm to adjust a raking width of the apparatus. A first rear tool bar is pivotally attached to the first arm to adjust a windrow width of the apparatus. The first rear tool bar is independently movable relative to the first forward tool bar. A second forward tool bar is pivotally attached to the second arm to adjust the raking width. A second rear tool bar is pivotally attached to the second arm to adjust the windrow width. The second rear tool bar is independently movable relative to the second forward tool bar. A rake wheel is attached to each of the first forward tool bar, first rear tool bar, second forward tool bar and second rear tool bar.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
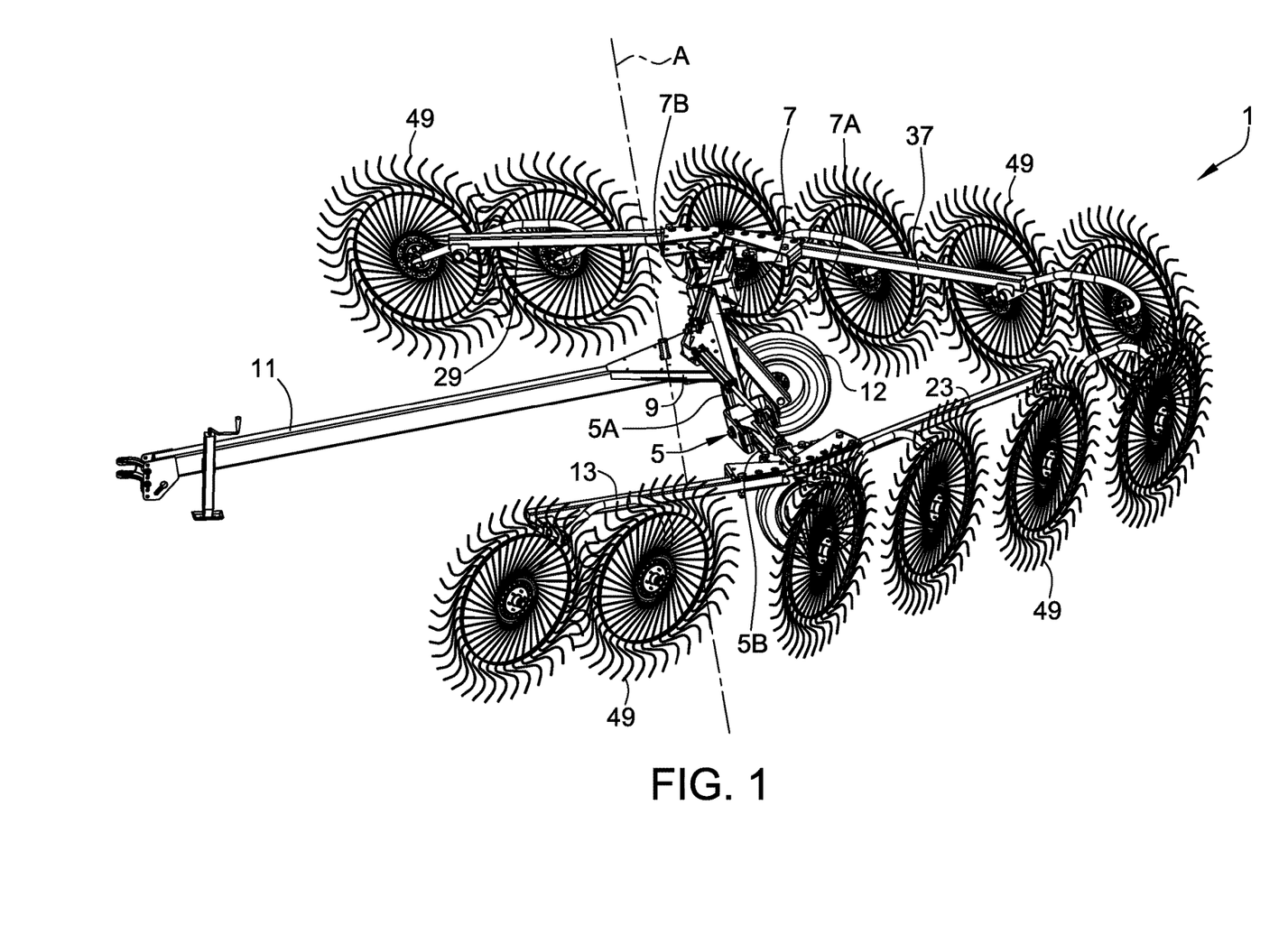
FIG. 1 is a perspective view of a raking apparatus in an operating position.
Figure 2:
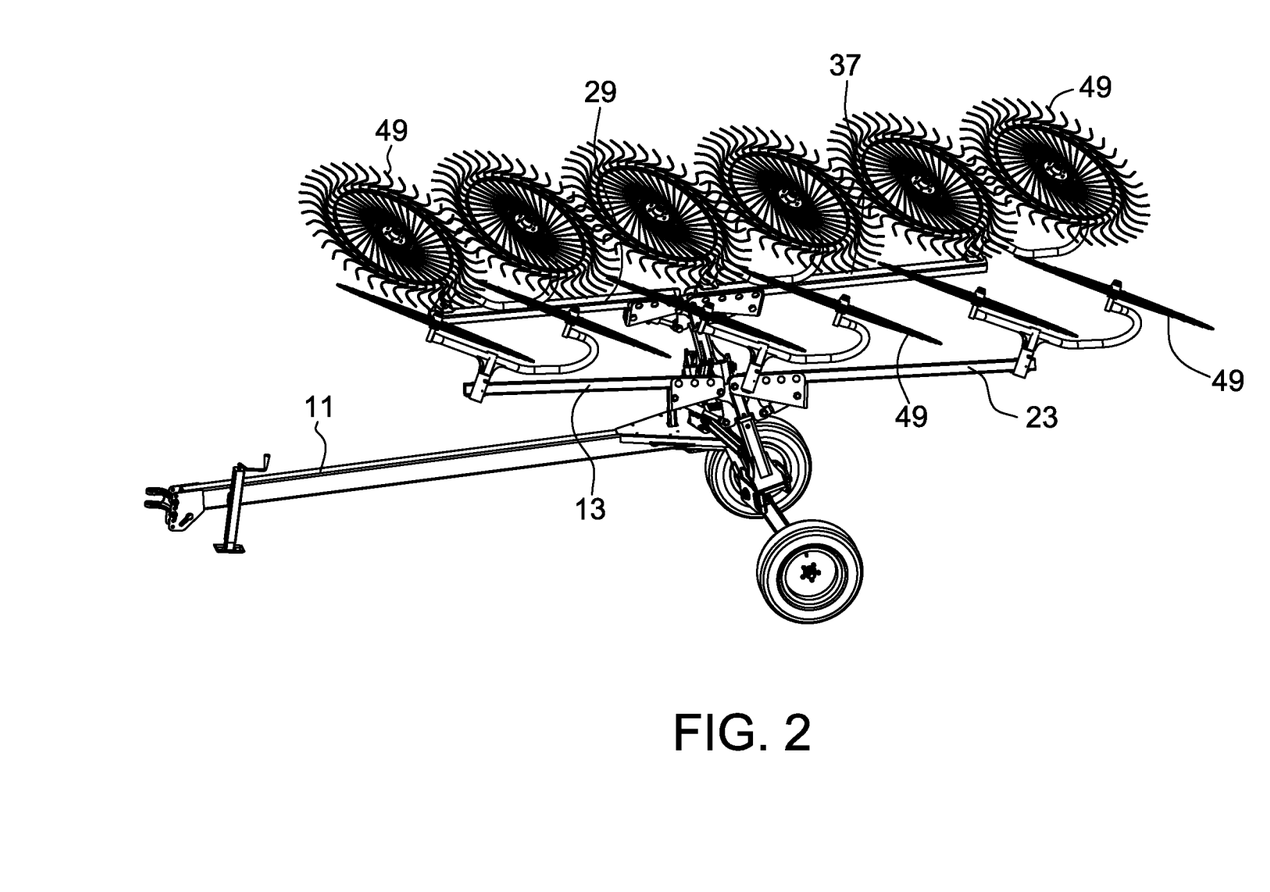
FIG. 2 is a perspective view of the raking apparatus in the travel position.
Figure 3:
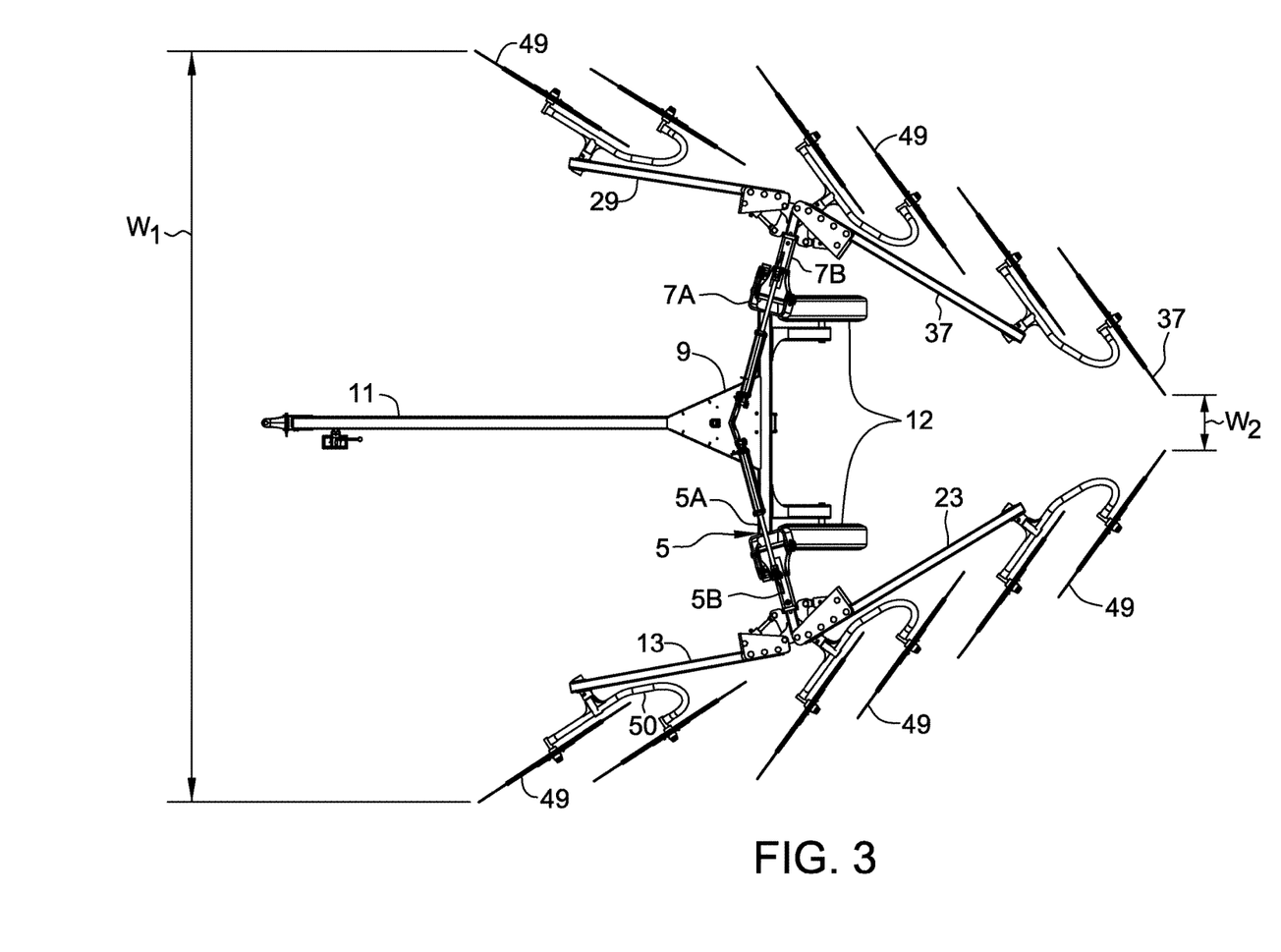
FIG. 3 is a top view of the raking apparatus.

With reference to FIG. 1, an adjustable raking apparatus 1 for gathering crop material (e.g., hay, straw, corn stover, sugar cane, or other agricultural product suitable for baling) into a windrow is shown. The raking apparatus 1 (which may also be referred to herein as a "wheel rake", "carted rake" or simply "rake") includes a main frame 9 having a first arm 5 and a second arm 7 that each contain end portions capable of pivoting upward into a travel position (FIG. 2). The main frame 9 includes a tongue 11 for coupling the rake 1 to a pull vehicle P (FIG. 7) such as a tractor. Transport wheels 12 are attached to the main frame 9 to propel the raking apparatus 1. In other embodiments, the raking apparatus 1 is self-propelled (FIG. 11), and optionally autonomous, and a tongue 11 may not be provided.

Figure 4:
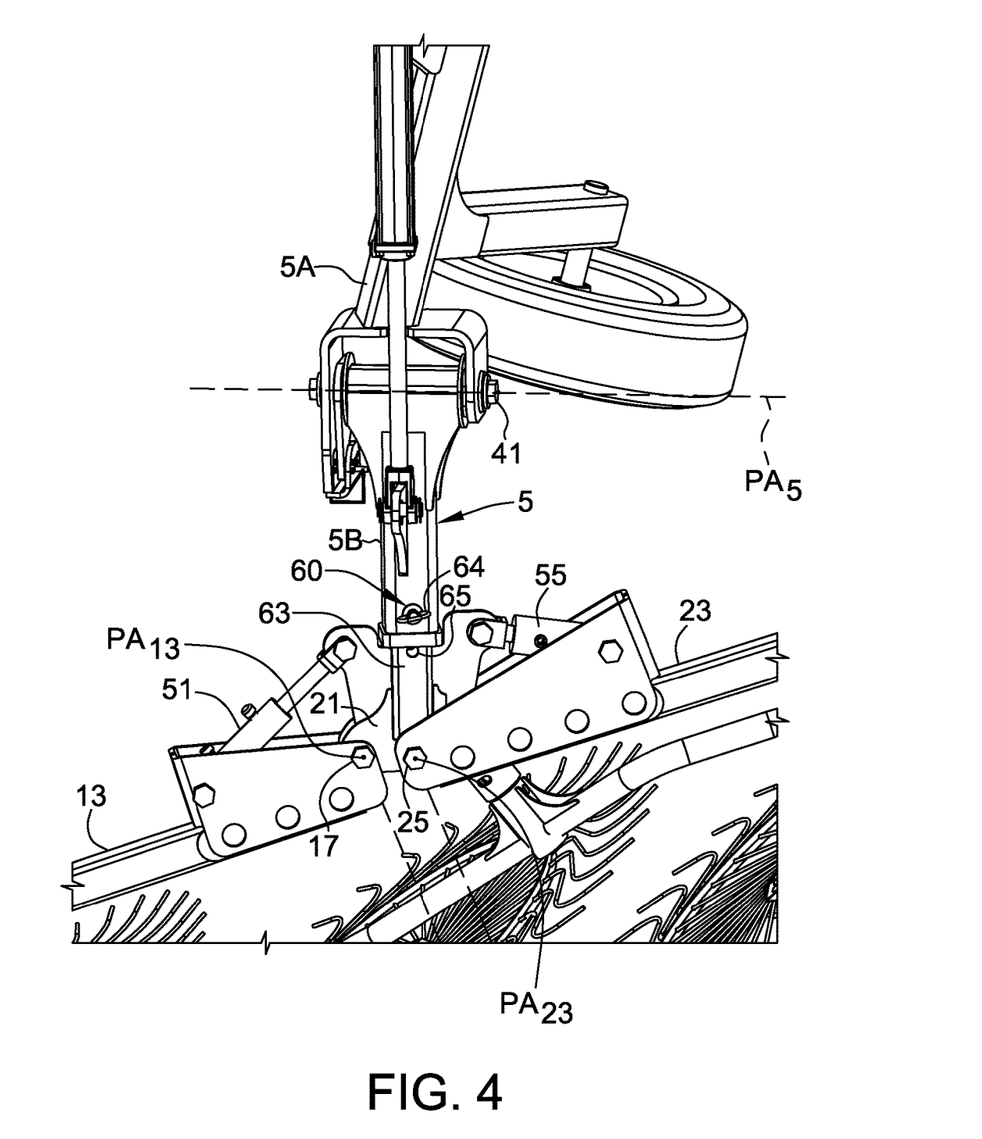
FIG. 4 is a top view of the connection between a first forward tool bar and a first arm of the raking apparatus and the connection between a first rear tool bar and the first arm of the raking apparatus.

The raking apparatus 1 includes a first forward tool bar 13 that is pivotally attached to the first arm 5 about a pin 17 (FIG. 4) that defines a first forward tool bar pivot axis $PA_{13}$. The pin 17 extends through a first arm bracket 21 of the first arm 5. The raking apparatus 1 also includes a first rear tool bar 23 that is pivotally attached to the first arm 5 about a pin 25 that defines a first rear tool bar pivot axis $PA_{23}$. The pin 25 extends through the first arm bracket 21.

Figure 5:
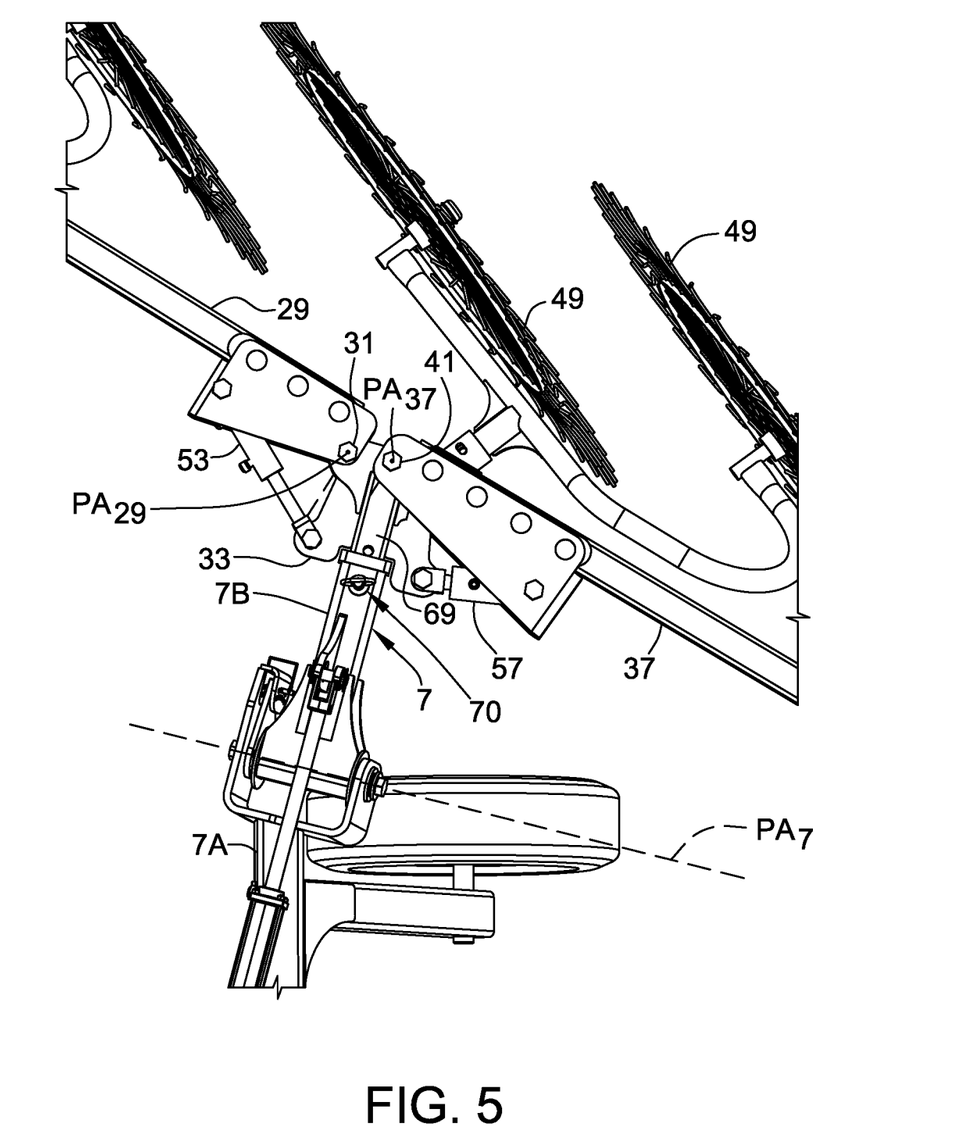
FIG. 5 is a top view of the connection between a second forward tool bar and a second arm of the raking apparatus and the connection between a second rear tool bar and the second arm of the raking apparatus.

The raking apparatus 1 includes a second forward tool bar 29 (FIG. 5) that is pivotally attached to the second arm 7 about a pin 31 that defines a second forward tool bar pivot axis $PA_{29}$. A second rear tool bar 37 is pivotally attached to the second arm 7 about a pin 41 that defines a pivot axis $PA_{37}$. Both pins 31, 41 extend through a second arm bracket 33 of the second arm 7.

The first forward tool bar 13 (FIG. 4) is not attached to the first rear tool bar 23 and the second forward tool bar 29 (FIG. 5) is not attached to the second rear tool bar 37. The tool bars 13, 23, 29, 37 include gusseted portions of the tool bar used for connection to the frame arms 5, 7 and actuators described below.

The first forward tool bar pivot axis $PA_{13}$, the first rear tool bar pivot axis $PA_{23}$, the second forward tool bar pivot axis $PA_{29}$ and the second rear tool bar pivot axis $PA_{37}$ are generally parallel to the vertical axis A (FIG. 1) of the raking apparatus in the operating position. In this arrangement, the first forward tool bar 13 pivots laterally (i.e., in a direction perpendicular to the axis A) relative to the first rear tool bar 23 and the second forward tool bar 29 pivots laterally relative to the second rear tool bar 37.

The apparatus 1 includes a plurality of rake wheels 49. Sets of two rake wheels 49 are attached to tube frames 50 that connect to the tool bars 13, 23, 29, 37. Two rake wheels 49 are attached to each of the first and second forward tool bars 13, 29. Four rake wheels 49 are attached to each of the first and second rear tool bars 23, 37. Each of the first and second forward tool bars 13, 29 and first and second rear tools bars 23, 37 may, however, include more or less rake wheels 49 unless stated otherwise.

The first arm 5 and the second arm 7 of the main frame 9 are each adjustable between an extended operating position in which the rake wheels engage the surface supporting the raking apparatus 1 and a travel position (FIG. 2) in which the arms 5, 7 are raised from the surface. The first arm 5 includes a rigid first portion 5A that is pivotally attached to a second portion 5B that may swing upward and downward relative to the first portion 5A. The second portion 5B is pivotally attached to both the first forward toolbar 13 and the first rear toolbar 23. Likewise, the second arm 7 (FIG. 5) includes a rigid first portion 7A that is pivotally attached to a second portion 7B. The second portion 7B is also pivotally attached to both the second forward toolbar 29 and the second rear toolbar 37. In this arrangement, the first arm 5 and the second arm 7 are each pivotal vertically with the extended operating position being a lowered position and the travel positon being a raised position with respect to a vertical axis A (FIG. 1) of the raking apparatus 1.

Figure 6:
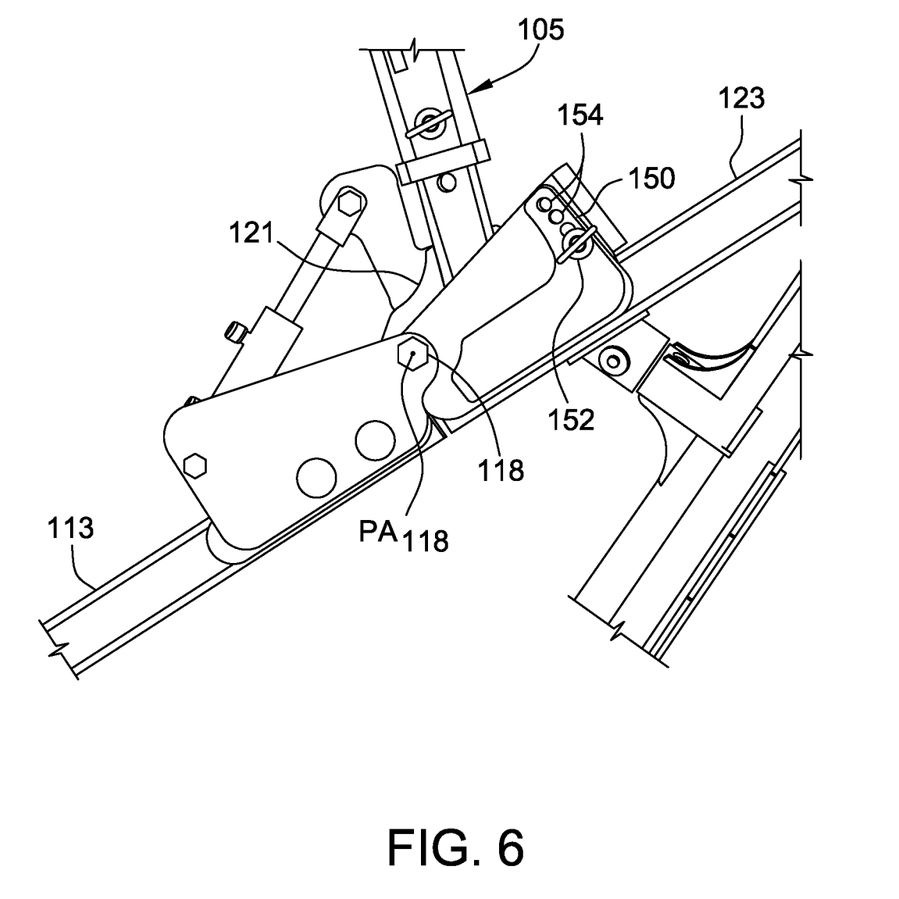
FIG. 6 is a top view of the connection between a first forward tool bar and a first arm of another embodiment of the raking apparatus and the connection between a first rear tool bar and a first arm.

As shown in FIGS. 1-5, the pivot axis $PA_{13}$ of the first forward tool bar 13 and the pivot axis $PA_{23}$ of the first rear tool bar 23 are different (i.e., do not share a common pivot axis). Similarly, the pivot axis $PA_{29}$ of the second forward tool bar 29 and the pivot axis $PA_{37}$ of the second rear tool bar 37 are different. In other embodiments and as shown in FIG. 6, the first forward tool bar 113 and the first rear tool bar 123 (and also the second forward tool bar and the second rear toolbar which are not shown) may share a pivot axis $PA_{118}$ through a pin 118.

The apparatus 1 includes a first forward tool bar actuator 51 (FIG. 4) attached to the first arm 5 and the first forward tool bar 13 and includes a second forward tool bar actuator 53 (FIG. 5) attached to the second arm 7 and the second forward tool bar 29. The actuators 51, 53 may be operated (separately or together) to adjust the raking width $W_1$ (FIG. 3) of the apparatus. In this way, the tool bars are independently movable. The actuators 51, 53 may be configured in parallel configuration (e.g., use of two hydraulic cylinders and a proportional flow divider that allow the cylinders to be driven upon activation of a single hydraulic lever) or the actuators may be controlled separate. In some embodiments, a single actuator (not shown) is used to adjust both the first and second forward tool bars 13, 29.

The adjustable raking apparatus 1 may include a first rear tool bar actuator 55 (FIG. 4) attached to the first arm 5 and the first rear tool bar 23 and may include a second rear tool bar actuator 57 (FIG. 5) attached to the second arm 7 and the second rear tool bar 37. The actuators 55, 57 may be operated to adjust the windrow width $W_2$ (FIG. 3) of the apparatus. The actuators 55, 57 may be operated in parallel such that a single operator control actuates both actuators 55, 57 or the actuators may be separately controlled. In some embodiments, a single actuator (not shown) is used to adjust both the first and second rear tool bars 23, 37.

In some embodiments, the adjustable raking apparatus 1 is controlled by monitoring the windrow output and automatically adjusting the windrow width $W_2$ based on the output. For example, the apparatus 1 may include sensors (cameras, photoelectric sensors, lasers, cameras and acoustic sensors such as an ultrasonic sensors) that trip or otherwise sense a plug of baling material between the most rearward rake wheels 49 of the first and second rear tool bars 23, 37. Once the sensors sense a plugged condition and a related signal is transmitted to a controller, the controller operates the first and/or second rear tool bar actuators 55, 57 to increase the windrow width $W_2$ (e.g., to fully open) to allow the plug to pass through the raking apparatus 1. Once the plug has been cleared, the first and second rear tool bars 23, 37 may be returned to their previous operating position or to a new operating position to establish a new windrow width (e.g., to avoid repeat plugging). Alternatively, the operator may sense a plugged condition and increase the windrow width $W_2$ temporarily.

Figure 7:
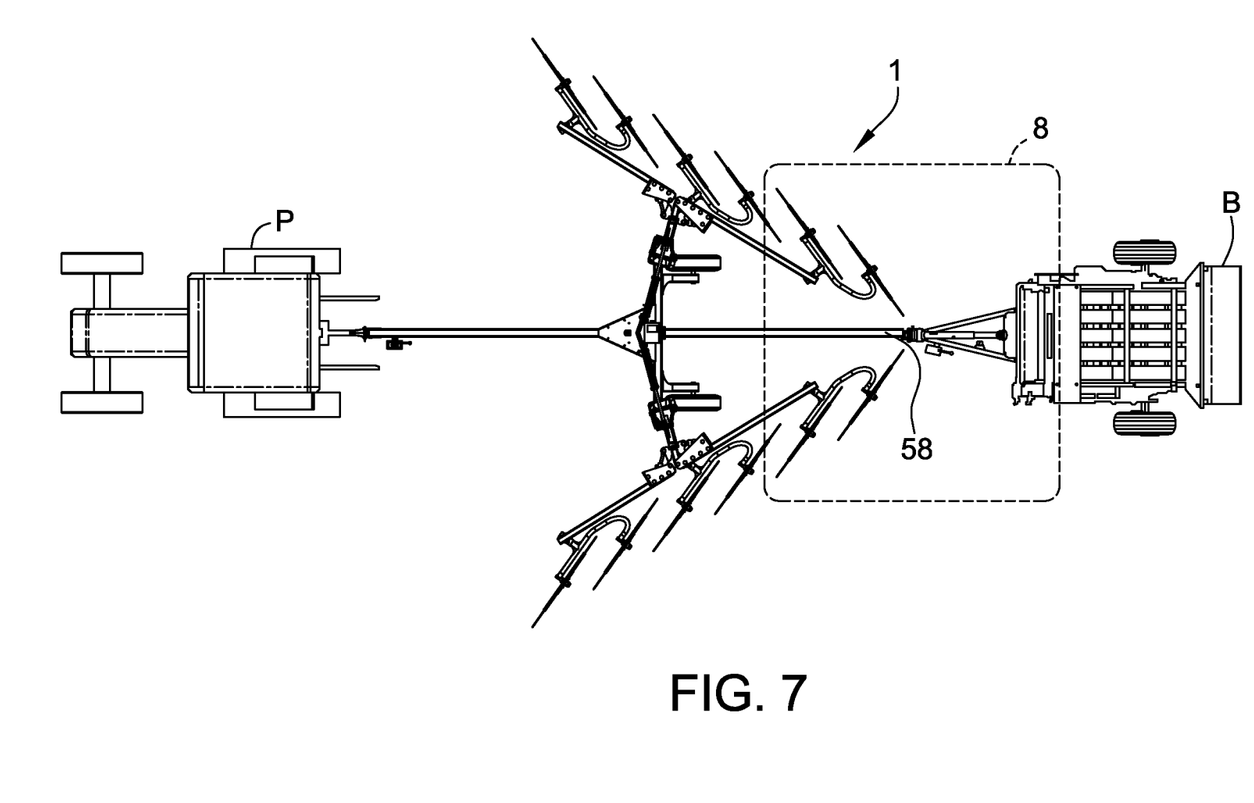
FIG. 7 is a top view of the raking apparatus attached to a baler and a pull vehicle.
Figure 8:
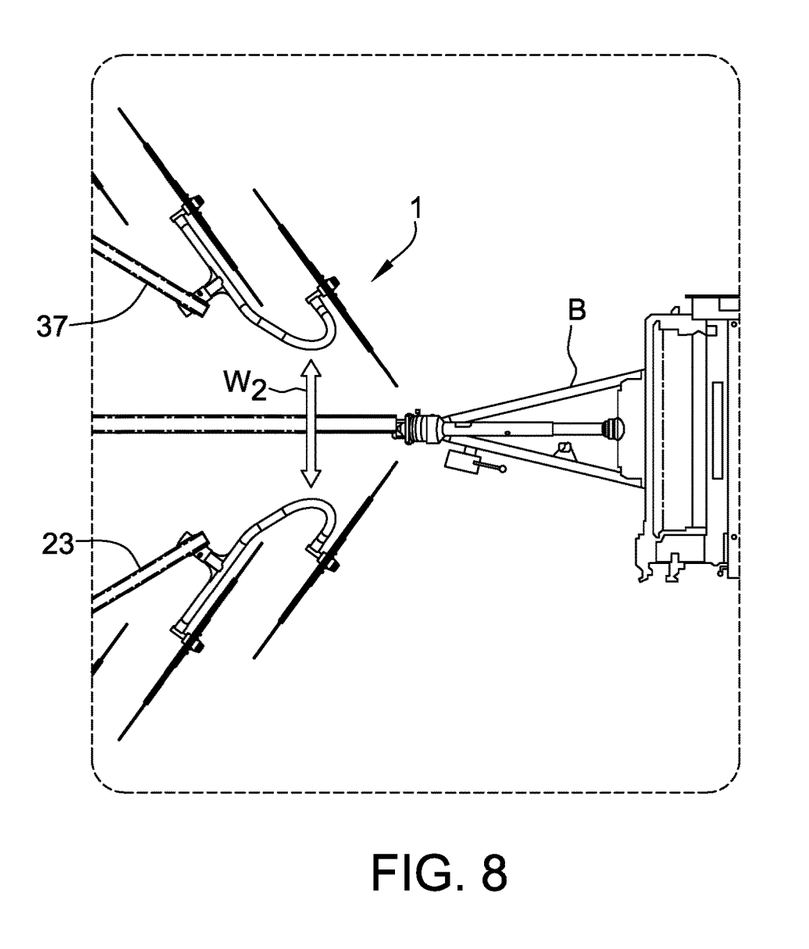
FIG. 8 is a top view of the raking apparatus attached to a baler with the first and second rear tool bars aligned to discharge a windrow in a center position.
Figure 9:
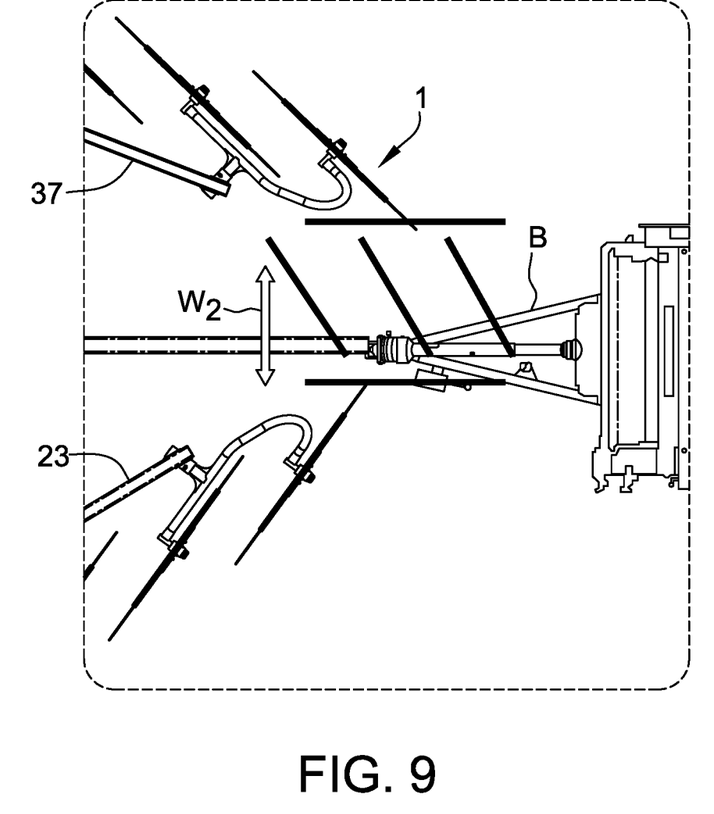
FIG. 9 is a top view of the raking apparatus attached to a baler with the first and second rear tool bars aligned to discharge a windrow in a first offset position.
Figure 10:
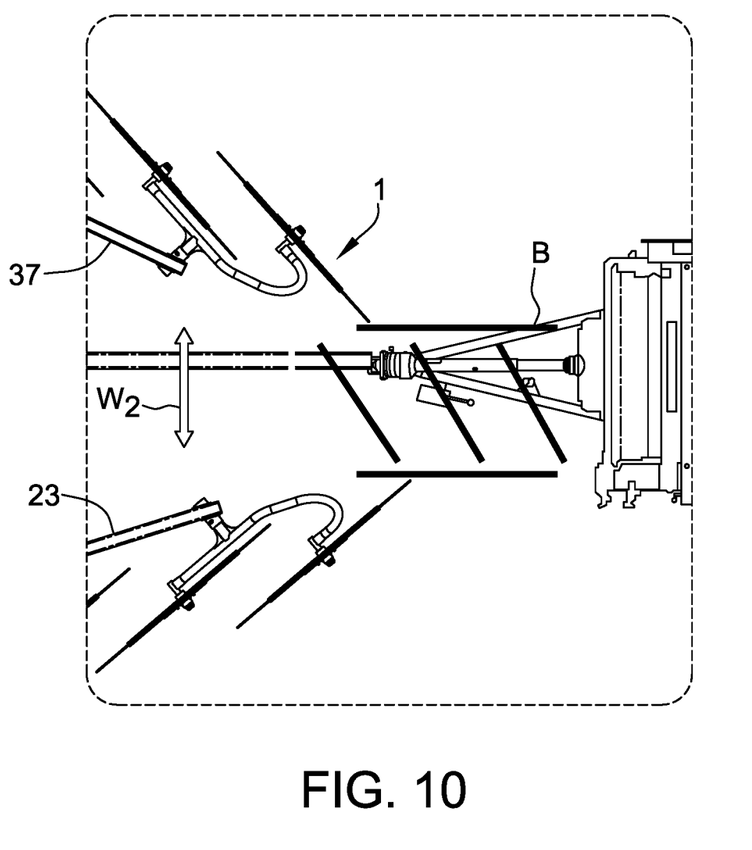
FIG. 10 is a top view of the raking apparatus attached to a baler with the first and second rear tool bars aligned to discharge a windrow in a second offset position opposite the first position.

As shown in FIG. 7, a baler B may be coupled to the raking apparatus 1. The raking apparatus 1 may include a tongue 58 that extends from the mainframe to attach the baler B. In the illustrated embodiment, the raking apparatus 1 and baler B are driven by pull vehicle P. The adjustable raking apparatus 1 may include a control system that "weaves" the windrow back and forth (i.e., moves the windrow in a direction perpendicular to the direction of travel of the apparatus 1). The control system controls the first and second rear tool bar actuators 55, 57 to allow the first and second rear tool bars 23, 37 to move in the same direction (i.e., in unison back and forth perpendicular to the direction of travel of the apparatus) while maintaining a consistent windrow width $W_2$. The tool bars 23, 37 weave back and forth (FIGS. 8 and 9) to allow baling material to fully fill the width of the bale chamber of the baler B to create a consistent bale shape. As shown in FIG. 8, the first and second rear tool bars are aligned to center the windrow with the baler B. In FIGS. 9 and 10, the first and second tool bars are aligned to off-set the windrow. As the raking apparatus 1 moves through the positions of FIGS. 8-10, the baling chamber of the baler B is completely filled.

The actuators 51, 53, 55, 57 may include various communication linkages (conduits and electrical connections) and controls to allow the raking width $W_1$ and/or the windrow width $W_2$ to be controlled from the pulling vehicle (e.g., tractor). In the illustrated embodiment, actuators 51, 53, 55, 57 are cylinders (e.g., hydraulic cylinders). In other embodiments, the actuators 51, 53 are electrical solenoids.

Figure 11:
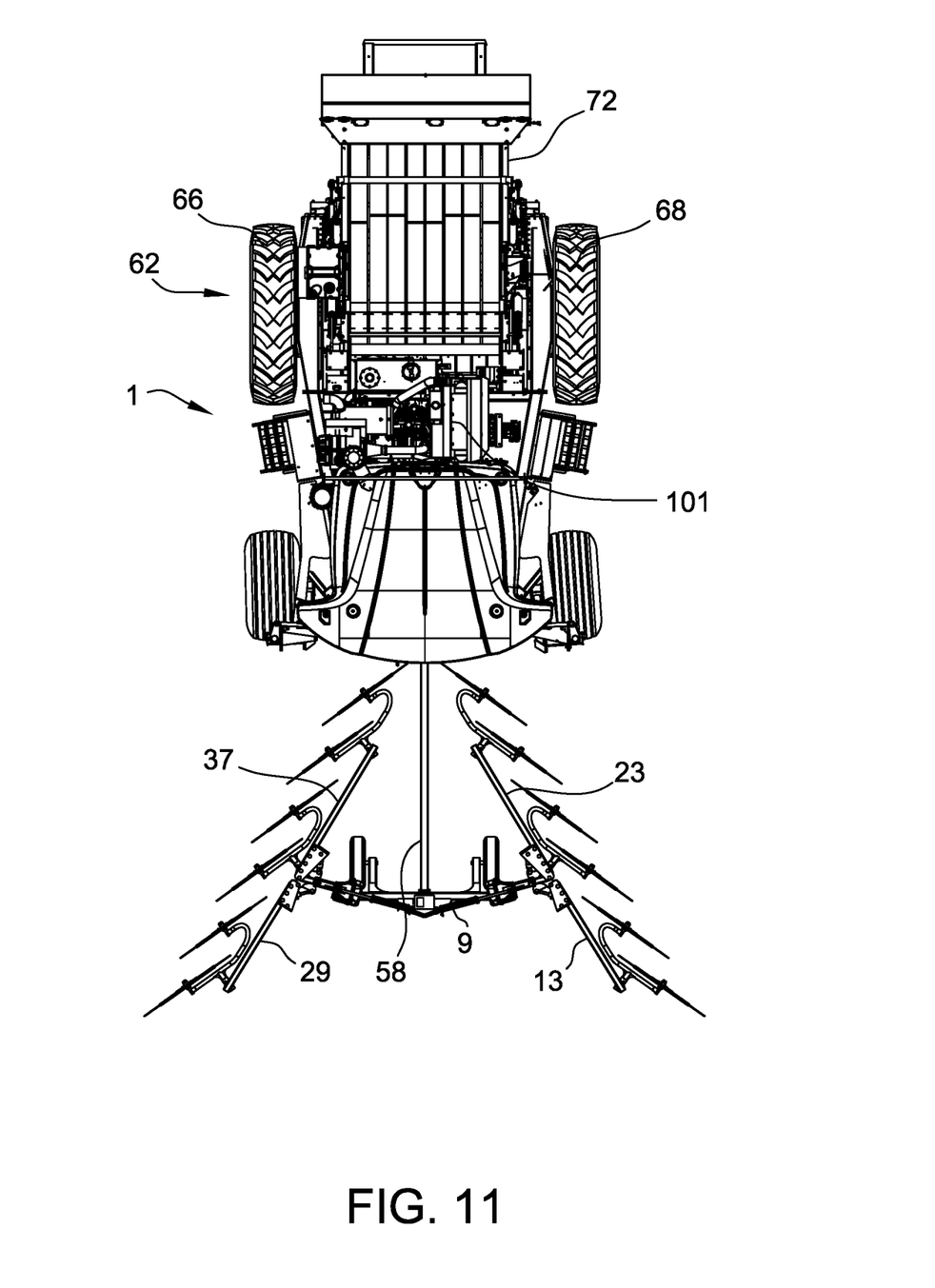
FIG. 11 is a top view of an embodiment of the raking apparatus with the raking apparatus being self-propelled and configured with a baling device.

In the embodiment shown in FIG. 11, the raking apparatus 1 is self-propelled and includes a baling device 70 mounted to the apparatus. Similar to the apparatus of FIG. 7, the adjustable raking apparatus 1 may also include a control system that controls the first and second rear tool bar actuators 55, 57 to allow the first and second rear tool bars 23, 37 to move in the same direction while maintaining a consistent windrow width $W_2$ to weave the windrow back and forth perpendicular to the direction of travel of the apparatus 1.

The raking apparatus includes a base vehicle 62 with first and second rear drive wheels 66, 68 that are driven by first and second motors disposed in the drive wheels. The vehicle 1 includes an engine 101 (e.g., gas or diesel powered engine) that drives one or more hydraulic pumps which in turn powers the various hydraulic motors and cylinders (e.g., first and second drive wheel motors, baling chamber motor and the like). The base vehicle 1 includes a baling device 72 for baling the windrow. A tongue connects the main frame 9 to the base vehicle 62. Forward tool bars 13, 29 and rear rake tool bars 23, 37 are connected to the main frame 9. In this regard, the adjustable tool bars may be incorporated onto the self-propelled vehicle in arrangements other than as shown in FIG. 11 unless stated otherwise.

In other embodiments, any of the first forward tool bar actuator 51, second forward tool bar actuator 53, first rear tool bar actuator 55, and second rear tool bar actuator 57 may be eliminated and an adjustable locking mechanism 150 (FIG. 6) may be used (i.e., a first forward tool bar locking mechanism and second forward tool bar locking mechanism and/or first rear tool bar locking mechanism and second rear tool bar locking mechanism may be used). The locking mechanism 150 may include a pin 152 and a series of spaced locking mechanism apertures 154. The pin 152 may be inserted in any aperture 154 to vary the angle the tool bar forms with the arm. The locking mechanism 150 may also be used in combination with any of the first forward tool bar actuator 51, second forward tool bar actuator 53, first rear tool bar actuator 55, and second rear tool bar actuator 57. Specifically, an actuator may be used to move the associated tool bar or arm into place, and the locking mechanism 150 may be used to hold the tool bar or arm at the desired angle.

The first arm 5 and second arm 7 may be adjustable to allow the arm to be shortened or lengthened. The first arm 5 includes a telescoping portion 63 that may be adjusted by use of a first arm locking mechanism 60. The locking mechanism 60 includes a pin 64 and a series of arm apertures 65. Similarly, the second arm 7 includes a telescoping portion 69 that may be adjusted by use of a second arm locking mechanism 70. The arms 5, 7 may be extended or retracted to adjust the raking width $W_1$ of the apparatus 1 and provide additional raking flexibility. In some embodiments, the first and second arms 5, 7 do not have an adjustable length and changes to the raking width are made solely through pivot of the first and second forward tool bars 13, 29.

To operate the raking apparatus 1, the arms 5, 7 are lowered from their raised travel position (FIG. 2) to the extended operating position (FIG. 1). The first forward tool bar actuator 51 (FIG. 4) and the second tool bar actuator 53 (FIG. 5) are operated to pivot the first forward tool bar 13 and the second forward tool bar 29 to adjust the distance $W_1$ between the most forward rake wheels 49 (i.e., to achieve the desired raking width). The desired width $W_1$ may be determined by the operator based on a variety of factors including the forage type, the volume of forage and the harvest method (e.g., the particular baler used).

The first rear tool bar actuator 55 and the second rear tool bar actuator 57 may be operated to pivot the first rear tool bar 23 and the second rear tool bar 37 to adjust the distance $W_2$ between the most rearward rake wheels (i.e., to achieve the desired windrow width). The desired windrow width $W_2$ may be chosen based on the baler used and should be of a sufficient width to ensure forage does not plug between the rear rake wheels.

In the apparatus of FIGS. 1-5, the arms 5, 7 may be extended to the operation position from the pulling vehicle and both the raking width $W_1$ and the windrow width $W_2$ may be controlled from the pulling vehicle. In embodiments in which the actuators (e.g., first and second rear tool bar actuators 55, 57) are eliminated and substituted for locking mechanisms 150 (FIG. 6), the distance (i.e., $W_1$ and/or $W_2$) is manually changed by the user.

Compared to conventional raking apparatus, the adjustable raking apparatus of the present disclosure has several advantages. By attaching the forward tool bar and the rear tool bar of each side of the apparatus to the arm of the main frame rather than to each other, the forward and rear tool bars may pivot independently (i.e., the tool bars are independently movable) of one another which allows adjustment of the raking width to not affect the windrow width and vice versa. This arrangement also reduces the profile of the apparatus when in the travel position. Use of separate forward and rear pivot points in each main frame arm improves the robustness of the apparatus, in part by effectively creating shorter potential fulcrum lengths within the rake. This arrangement also allows stresses resulting from a change in terrain encountered by a rake wheel to be isolated to the tool bar to which the rake wheel is attached (i.e. the stress is not transferred to both the forward and rear tool bars). By attaching both the forward and rear tool bars to the arm (as opposed to each other), adjustment of the raking width and windrow width is simplified. By allowing the forward and rear tool bars to be adjusted, the structural components that allow the lengths of the first and second arms to be adjusted (e.g., locking mechanism and telescoping portions) may be eliminated. In embodiments in which the raking apparatus includes a control system (i.e., sensors and/or controllers) that controls the first and second rear tool bars to allow the relative position of the windrow to be weaved back and forth, the baler (which may be coupled to the raking apparatus) may be filled across its baler chamber width to allow a more consistent and uniform bale to be produced.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An adjustable raking apparatus for gathering crop material into a windrow, the raking apparatus comprising:
    a plurality of rake wheels;
    a main frame having a first arm and a second arm, the first arm and the second arm each being adjustable between an extended operating position in which the rake wheels engage a surface supporting the raking apparatus and a travel position in which the rake wheels are raised from the surface;
    a first forward tool bar directly pivotally attached to the first arm to adjust a raking width of the apparatus;
    a first rear tool bar directly pivotally attached to the first arm to adjust a windrow width of the apparatus, the first rear tool bar being independently movable relative to the first forward tool bar;
    a second forward tool bar directly pivotally attached to the second arm to adjust the raking width; and
    a second rear tool bar directly pivotally attached to the second arm to adjust the windrow width, the second rear tool bar being independently movable relative to the second forward tool bar, wherein a rake wheel is attached to each of the first forward tool bar, first rear tool bar, second forward tool bar and second rear tool bar.

2. The adjustable raking apparatus as set forth in claim 1 wherein the first forward tool bar, first rear tool bar, second forward tool bar and second rear tool bar each have a pivot axis, the pivot axis of the first forward tool bar and the pivot axis of the first rear tool bar being different and the pivot axis of the second forward tool bar and the pivot axis of the second rear tool bar being different.

3. The adjustable raking apparatus as set forth in claim 1 wherein the first forward tool bar, first rear tool bar, second forward tool bar and second rear tool bar each have a pivot axis, the pivot axis of the first forward tool bar and the first rear tool bar being the same and the pivot axis of the second forward tool bar and the second rear tool bar being the same.

4. The adjustable raking apparatus as set forth in claim 1 wherein the first forward tool bar is not attached to the first rear tool bar and the second forward tool bar is not attached to the second rear tool bar.

5. The adjustable raking apparatus as set forth in claim 1 comprising a first forward tool bar actuator and a second forward tool bar actuator for adjusting a raking width of the raking apparatus.

6. The adjustable raking apparatus as set forth in claim 5 wherein the first forward tool bar actuator and the second forward tool bar actuator include communication links to allow the raking width to be controlled from a pulling vehicle.

7. The adjustable raking apparatus as set forth in claim 5 wherein the first forward tool bar actuator is mounted to the first arm and the second forward tool bar actuator is mounted to the second arm.

8. The adjustable raking apparatus as set forth in claim 1 comprising a first rear tool bar actuator and a second rear tool bar actuator for adjusting a windrow width of the raking apparatus.

9. The adjustable raking apparatus as set forth in claim 8 wherein the first rear tool bar actuator is mounted to the first arm and the second rear tool bar actuator is mounted to the second arm.

10. The adjustable raking apparatus as set forth in claim 8 wherein the first rear tool bar actuator and the second rear tool bar actuator include communication links to allow the windrow width to be controlled from a pulling vehicle.

11. The adjustable raking apparatus as set forth in claim 1 comprising:
    a first rear tool bar locking mechanism for locking the position of the first rear tool bar; and
    a second rear tool bar locking mechanism for locking the position of the second rear tool bar.

12. The adjustable raking apparatus as set forth in claim 1 comprising:
    a first forward tool bar locking mechanism for locking the position of the first forward tool bar; and
    a second forward tool bar locking mechanism for locking the position of the second forward tool bar.

13. The adjustable raking apparatus as set forth in claim 1 wherein at least two raking wheels are attached to each of the first forward tool bar, first rear tool bar, second forward tool bar and second rear tool bar.

14. The adjustable raking apparatus as set forth in claim 1 wherein the first arm and second arm are each vertically pivotal with the extended operating position being a lowered position and the travel position being a raised position with respect to a vertical axis of the raking apparatus.

15. The adjustable raking apparatus as set forth in claim 14 wherein the first arm and second arm also have an adjustable length to adjust a raking width of the raking apparatus.

16. The adjustable raking apparatus as set forth in claim 1 comprising a control system for controlling the first and second rear tool bars to cause the tool bars to weave perpendicular to the direction of travel of the raking apparatus.

17. The adjustable raking apparatus as set forth in claim 1 comprising a sensor for sensing a plug of baling material between two most rearward rake wheels.

18. A method for raking material into a windrow by use of the adjustable raking apparatus of claim 1, the method comprising:
    pivoting the first forward tool bar and pivoting the second forward tool bar to a desired raking width; and
    pivoting the first rear tool bar and pivoting the second rear tool bar to a desired windrow width.

19. The method as set forth in claim 18 wherein the adjustable raking apparatus is attached to a pull vehicle and pivoting of the first forward tool bar and pivoting of the second forward tool bar are controlled from the pull vehicle.

20. The method as set forth in claim 18 wherein pivoting of the first rear tool bar and pivoting of the second rear tool bar are controlled from the pull vehicle.

\* \* \* \* \*